United States Patent
Hayward

(10) Patent No.: US 8,819,404 B2
(45) Date of Patent: *Aug. 26, 2014

(54) METHOD OF DISSEMINATING ADVERTISEMENTS USING AN EMBEDDED MEDIA PLAYER PAGE

(71) Applicant: AOL Inc., Dulles, VA (US)

(72) Inventor: Monte Duane Hayward, Seattle, WA (US)

(73) Assignee: AOL Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/049,827

(22) Filed: Oct. 9, 2013

(65) Prior Publication Data

US 2014/0040047 A1 Feb. 6, 2014

Related U.S. Application Data

(63) Continuation of application No. 13/399,602, filed on Feb. 17, 2012, now Pat. No. 8,595,475, which is a continuation of application No. 10/415,021, filed as application No. PCT/US01/51227 on Oct. 24, 2001, now Pat. No. 8,122,236.

(60) Provisional application No. 60/242,848, filed on Oct. 24, 2000.

(51) Int. Cl.
*G06F 9/00* (2006.01)

(52) U.S. Cl.
USPC .......................................................... 713/100

(58) Field of Classification Search
USPC .......................................................... 713/100
See application file for complete search history.

(56) References Cited

U.S. PATENT DOCUMENTS

| 5,241,305 A | 8/1993 | Fascenda et al. |
| 5,339,434 A | 8/1994 | Rusis |
| 5,345,227 A | 9/1994 | Fascenda et al. |
| 5,467,471 A | 11/1995 | Bader |
| 5,483,522 A | 1/1996 | Derby et al. |

(Continued)

FOREIGN PATENT DOCUMENTS

| AU | 3594500 | 8/2000 |
| CN | 1471669 | 1/2004 |

(Continued)

OTHER PUBLICATIONS

U.S. Appl. No. 60/242,848, filed Oct. 2000, Hayward.

(Continued)

*Primary Examiner* — Matthew Smithers
(74) *Attorney, Agent, or Firm* — Finnegan, Henderson, Farabow, Garrett & Dunner, LLP

(57) ABSTRACT

A method of disseminating advertisements includes the step of transmitting to a media device (110) an embedded media player page for playing a media file. The embedded media player page allows a user of the media device (110) to create a bookmark for a browser. The bookmark points to the embedded media player page. The bookmark includes an address of the media file as a parameter. When the bookmark is used in the browser to play the media file, the embedded media player page instructs the media device (110) to request an advertisement from an advertisement server (104) for display in the embedded media player page.

20 Claims, 6 Drawing Sheets

(56) References Cited

U.S. PATENT DOCUMENTS

| | | |
|---|---|---|
| 5,491,511 A | 2/1996 | Odle |
| 5,600,364 A | 2/1997 | Hendricks et al. |
| 5,616,876 A | 4/1997 | Cluts |
| 5,633,683 A | 5/1997 | Rosengren et al. |
| 5,634,064 A | 5/1997 | Warnock et al. |
| 5,680,323 A | 10/1997 | Barnard |
| 5,684,999 A | 11/1997 | Okamoto |
| 5,721,827 A | 2/1998 | Logan et al. |
| 5,737,619 A | 4/1998 | Judson |
| 5,761,436 A | 6/1998 | Nielsen |
| 5,802,361 A | 9/1998 | Wang et al. |
| 5,870,755 A | 2/1999 | Stevens et al. |
| 5,875,332 A | 2/1999 | Wang et al. |
| 5,892,843 A | 4/1999 | Zhou et al. |
| 5,892,919 A | 4/1999 | Nielsen |
| 5,895,471 A | 4/1999 | King et al. |
| 5,907,837 A | 5/1999 | Ferrel et al. |
| 5,915,001 A | 6/1999 | Uppaluru |
| 5,917,424 A | 6/1999 | Goldman et al. |
| 5,918,232 A | 6/1999 | Pouschine et al. |
| 5,920,854 A | 7/1999 | Kirsch et al. |
| 5,920,856 A | 7/1999 | Syeda-Mahmood |
| 5,920,859 A | 7/1999 | Li |
| 5,924,116 A | 7/1999 | Aggarwal et al. |
| 5,930,783 A | 7/1999 | Li et al. |
| 5,933,811 A | 8/1999 | Angles et al. |
| 5,935,210 A | 8/1999 | Stark |
| 5,941,944 A | 8/1999 | Messerly |
| 5,946,697 A | 8/1999 | Shen |
| 5,953,718 A | 9/1999 | Wical |
| 5,956,484 A | 9/1999 | Rosenberg et al. |
| 5,956,722 A | 9/1999 | Jacobson et al. |
| 5,963,940 A | 10/1999 | Liddy et al. |
| 5,974,409 A | 10/1999 | Sanu et al. |
| 5,983,218 A | 11/1999 | Syeda-Mahmood |
| 5,983,237 A | 11/1999 | Jain et al. |
| 5,987,466 A | 11/1999 | Greer et al. |
| 5,991,374 A | 11/1999 | Hazenfield |
| 5,991,756 A | 11/1999 | Wu |
| 5,991,809 A | 11/1999 | Kriegsman |
| 5,995,921 A | 11/1999 | Richards et al. |
| 5,999,664 A | 12/1999 | Mahoney et al. |
| 5,999,940 A | 12/1999 | Ranger |
| 6,006,225 A | 12/1999 | Bowman et al. |
| 6,006,242 A | 12/1999 | Poole et al. |
| 6,006,264 A | 12/1999 | Colby et al. |
| 6,009,271 A | 12/1999 | Whatley |
| 6,009,410 A | 12/1999 | LeMole et al. |
| 6,012,126 A | 1/2000 | Aggarwal et al. |
| 6,018,619 A | 1/2000 | Allard et al. |
| 6,018,768 A | 1/2000 | Ullman et al. |
| 6,026,391 A | 2/2000 | Osborn et al. |
| 6,026,413 A | 2/2000 | Challenger et al. |
| 6,029,165 A | 2/2000 | Gable |
| 6,035,330 A | 3/2000 | Astiz et al. |
| 6,038,561 A | 3/2000 | Snyder et al. |
| 6,038,610 A | 3/2000 | Belfiore et al. |
| 6,044,375 A | 3/2000 | Shmueli et al. |
| 6,055,543 A | 4/2000 | Christensen et al. |
| 6,061,692 A | 5/2000 | Thomas et al. |
| 6,064,376 A | 5/2000 | Berezowksi et al. |
| 6,065,058 A | 5/2000 | Hailpern et al. |
| 6,067,552 A | 5/2000 | Yu |
| 6,067,565 A | 5/2000 | Horvitz |
| 6,069,669 A | 5/2000 | Park et al. |
| 6,078,916 A | 6/2000 | Culliss |
| 6,081,774 A | 6/2000 | De Hita et al. |
| 6,092,072 A | 7/2000 | Guha et al. |
| 6,092,100 A | 7/2000 | Berstis et al. |
| 6,092,118 A | 7/2000 | Tsang |
| 6,094,684 A | 7/2000 | Pallmann |
| 6,098,064 A | 8/2000 | Pirolli et al. |
| 6,112,202 A | 8/2000 | Kleinberg |
| 6,112,203 A | 8/2000 | Bharat et al. |
| 6,118,450 A | 9/2000 | Proehl et al. |
| 6,121,963 A | 9/2000 | Ange et al. |
| 6,128,627 A | 10/2000 | Mattis et al. |
| 6,131,095 A | 10/2000 | Low et al. |
| 6,134,548 A | 10/2000 | Gottsman et al. |
| 6,138,113 A | 10/2000 | Dean et al. |
| 6,138,162 A | 10/2000 | Pistriotto et al. |
| 6,151,584 A | 11/2000 | Papierniak et al. |
| 6,157,924 A | 12/2000 | Austin |
| 6,163,778 A | 12/2000 | Fogg et al. |
| 6,173,287 B1 | 1/2001 | Eberman et al. |
| 6,175,829 B1 | 1/2001 | Li et al. |
| 6,175,830 B1 | 1/2001 | Maynard |
| 6,177,931 B1 | 1/2001 | Alexander et al. |
| 6,178,439 B1 | 1/2001 | Feit |
| 6,181,336 B1 | 1/2001 | Chiu et al. |
| 6,192,382 B1 | 2/2001 | Lafer et al. |
| 6,208,988 B1 | 3/2001 | Schultz |
| 6,211,871 B1 | 4/2001 | Himmel et al. |
| 6,223,178 B1 | 4/2001 | Himmel et al. |
| 6,225,995 B1 | 5/2001 | Jacobs et al. |
| 6,240,416 B1 | 5/2001 | Immon et al. |
| 6,249,844 B1 | 6/2001 | Schloss et al. |
| 6,251,016 B1 | 6/2001 | Tsuda et al. |
| 6,253,204 B1 | 6/2001 | Glass et al. |
| 6,256,032 B1 | 7/2001 | Hugh |
| 6,256,623 B1 | 7/2001 | Jones |
| 6,262,724 B1 | 7/2001 | Crow et al. |
| 6,267,676 B1 | 7/2001 | Nagaoka |
| 6,272,505 B1 | 8/2001 | De La Huerga |
| 6,275,820 B1 | 8/2001 | Navin-Chandra et al. |
| 6,282,548 B1 | 8/2001 | Burner et al. |
| 6,282,549 B1 | 8/2001 | Hoffert et al. |
| 6,310,601 B1 | 10/2001 | Moore et al. |
| 6,314,456 B1 | 11/2001 | Van Andel et al. |
| 6,321,200 B1 | 11/2001 | Casey |
| 6,324,536 B1 | 11/2001 | Rofrano |
| 6,327,574 B1 | 12/2001 | Kramer et al. |
| 6,330,593 B1 | 12/2001 | Roberts et al. |
| 6,351,755 B1 | 2/2002 | Najork et al. |
| 6,374,260 B1 | 4/2002 | Hoffert et al. |
| 6,377,995 B2 | 4/2002 | Agraharam et al. |
| 6,385,596 B1 * | 5/2002 | Wiser et al. ............ 705/51 |
| 6,389,467 B1 | 5/2002 | Eyal |
| 6,393,415 B1 | 5/2002 | Getchius et al. |
| 6,411,724 B1 | 6/2002 | Vaithilingam et al. |
| 6,411,952 B1 | 6/2002 | Bharat et al. |
| 6,418,441 B1 | 7/2002 | Call |
| 6,421,675 B1 | 7/2002 | Ryan et al. |
| 6,424,966 B1 | 7/2002 | Meyerzon et al. |
| 6,434,573 B1 | 8/2002 | Jacobson et al. |
| 6,438,539 B1 | 8/2002 | Korolev et al. |
| 6,446,083 B1 | 9/2002 | Leight et al. |
| 6,449,627 B1 | 9/2002 | Baer et al. |
| 6,470,307 B1 | 10/2002 | Turney et al. |
| 6,484,199 B2 | 11/2002 | Eyal |
| 6,486,891 B1 | 11/2002 | Rice |
| 6,490,585 B1 | 12/2002 | Hanson et al. |
| 6,493,720 B1 | 12/2002 | Chu et al. |
| 6,498,897 B1 | 12/2002 | Nelson et al. |
| 6,516,337 B1 | 2/2003 | Tripp et al. |
| 6,519,564 B1 | 2/2003 | Hoffberg et al. |
| 6,519,603 B1 | 2/2003 | Bays et al. |
| 6,519,648 B1 | 2/2003 | Eyal |
| 6,523,000 B1 | 2/2003 | Ando et al. |
| 6,539,382 B1 | 3/2003 | Bryne et al. |
| 6,547,829 B1 | 4/2003 | Meyerzon et al. |
| 6,549,922 B1 | 4/2003 | Srivastava et al. |
| 6,556,983 B1 | 4/2003 | Altschuler et al. |
| 6,567,800 B1 | 5/2003 | Barrera et al. |
| 6,584,468 B1 | 6/2003 | Gabriel et al. |
| 6,587,127 B1 | 7/2003 | Leeke et al. |
| 6,587,547 B1 | 7/2003 | Zirngibl et al. |
| 6,594,662 B1 | 7/2003 | Sieffert et al. |
| 6,594,682 B2 | 7/2003 | Peterson et al. |
| 6,594,694 B1 | 7/2003 | Najork et al. |
| 6,598,051 B1 | 7/2003 | Wiener et al. |
| 6,605,120 B1 | 8/2003 | Fields et al. |
| 6,606,639 B2 | 8/2003 | Jacobsen et al. |
| 6,638,317 B2 | 10/2003 | Nakao et al. |

(56) References Cited

U.S. PATENT DOCUMENTS

| | | |
|---|---|---|
| 6,643,661 B2 | 11/2003 | Polizzi et al. |
| 6,651,058 B1 | 11/2003 | Sundaresan et al. |
| 6,654,749 B1 | 11/2003 | Nashed |
| 6,658,402 B1 | 12/2003 | Dutta |
| 6,675,174 B1 | 1/2004 | Bolle et al. |
| 6,681,227 B1 | 1/2004 | Kojima et al. |
| 6,701,355 B1 | 3/2004 | Brandt et al. |
| 6,708,176 B2 | 3/2004 | Strunk et al. |
| 6,711,590 B1 | 3/2004 | Lennon et al. |
| 6,718,328 B1 | 4/2004 | Norris |
| 6,718,365 B1 | 4/2004 | Dutta |
| 6,718,551 B1 | 4/2004 | Swix et al. |
| 6,728,767 B1 | 4/2004 | Day et al. |
| 6,760,721 B1 | 7/2004 | Chasen et al. |
| 6,760,916 B2 | 7/2004 | Holtz et al. |
| 6,782,391 B1 | 8/2004 | Scher |
| 6,782,427 B1 | 8/2004 | Van Andel et al. |
| 6,785,688 B2 | 8/2004 | Abajian et al. |
| 6,816,858 B1 | 11/2004 | Coden et al. |
| 6,819,339 B1 | 11/2004 | Dowling |
| 6,839,903 B1 | 1/2005 | Shintani et al. |
| 6,842,761 B2 | 1/2005 | Diamond et al. |
| 6,847,977 B2 | 1/2005 | Abajian |
| 6,859,213 B1 | 2/2005 | Carter |
| 6,865,593 B1 | 3/2005 | Reshef et al. |
| 6,877,002 B2 | 4/2005 | Prince |
| 6,895,402 B1 | 5/2005 | Emens et al. |
| 6,911,998 B2 | 6/2005 | Wiseman |
| 6,931,397 B1 | 8/2005 | Sundaresan |
| 6,938,034 B1 | 8/2005 | Kraft et al. |
| 6,941,300 B2 | 9/2005 | Jensen-Grey |
| 6,959,326 B1 | 10/2005 | Day et al. |
| 6,961,714 B1 | 11/2005 | LeVine |
| 6,981,002 B2 | 12/2005 | Nunez |
| 6,983,324 B1 | 1/2006 | Block et al. |
| 6,990,630 B2 | 1/2006 | Landsman et al. |
| 6,996,627 B1 | 2/2006 | Carden |
| 7,000,242 B1 | 2/2006 | Haber |
| 7,080,064 B2 | 7/2006 | Sundaresan |
| 7,080,321 B2 | 7/2006 | Aleksander et al. |
| 7,103,605 B1 | 9/2006 | Hazi et al. |
| 7,162,691 B1 | 1/2007 | Chatterjee et al. |
| 7,181,438 B1 | 2/2007 | Szabo |
| 7,181,444 B2 | 2/2007 | Porter et al. |
| 7,185,003 B2 | 2/2007 | Bayliss et al. |
| 7,209,571 B2 | 4/2007 | Davis et al. |
| 7,222,163 B1 | 5/2007 | Girouard et al. |
| 7,228,305 B1 | 6/2007 | Eyal et al. |
| 7,240,100 B1 | 7/2007 | Wein et al. |
| 7,281,034 B1 | 10/2007 | Eyal |
| 7,340,533 B2 | 3/2008 | Murtza et al. |
| 7,346,512 B2 | 3/2008 | Li-Chun Wang et al. |
| 7,353,246 B1 | 4/2008 | Rosen et al. |
| 7,450,734 B2 | 11/2008 | Rodriguez et al. |
| 7,500,007 B2 | 3/2009 | Ikezoye et al. |
| 7,543,024 B2 | 6/2009 | Holstege |
| 7,630,986 B1 | 12/2009 | Herz et al. |
| 7,720,836 B2 | 5/2010 | Abajian et al. |
| 7,752,186 B2 | 7/2010 | Abajian et al. |
| 7,785,688 B2 | 8/2010 | Ono et al. |
| 7,849,160 B2 | 12/2010 | Hayward |
| 8,095,529 B2 | 1/2012 | Diamond et al. |
| 8,122,236 B2 | 2/2012 | Hayward |
| 8,209,311 B2 | 6/2012 | Abajian et al. |
| 8,209,635 B2 | 6/2012 | Thom |
| 8,595,475 B2 * | 11/2013 | Hayward .................... 713/100 |
| 2001/0044719 A1 | 11/2001 | Casey |
| 2001/0044795 A1 | 11/2001 | Cohen et al. |
| 2001/0049824 A1 | 12/2001 | Baker et al. |
| 2001/0054001 A1 | 12/2001 | Robinson |
| 2002/0002541 A1 | 1/2002 | Williams |
| 2002/0004733 A1 | 1/2002 | Addante |
| 2002/0010798 A1 | 1/2002 | Ben-Shaul et al. |
| 2002/0013897 A1 | 1/2002 | McTernan et al. |
| 2002/0024532 A1 | 2/2002 | Fables et al. |
| 2002/0032906 A1 | 3/2002 | Grossman |
| 2002/0035573 A1 | 3/2002 | Black et al. |
| 2002/0049738 A1 | 4/2002 | Epstein |
| 2002/0052928 A1 | 5/2002 | Stern et al. |
| 2002/0053078 A1 | 5/2002 | Holtz et al. |
| 2002/0059184 A1 | 5/2002 | Lian et al. |
| 2002/0065947 A1 | 5/2002 | Wishoff et al. |
| 2002/0069105 A1 | 6/2002 | do Rosario Botelho et al. |
| 2002/0073115 A1 | 6/2002 | Davis |
| 2002/0078003 A1 | 6/2002 | Krysiak et al. |
| 2002/0078014 A1 | 6/2002 | Pallmann |
| 2002/0078441 A1 | 6/2002 | Drake et al. |
| 2002/0082901 A1 | 6/2002 | Dunning et al. |
| 2002/0083469 A1 | 6/2002 | Jeannin et al. |
| 2002/0099694 A1 | 7/2002 | Diamond et al. |
| 2002/0099700 A1 | 7/2002 | Li |
| 2002/0099723 A1 | 7/2002 | Garcia-Chiesa |
| 2002/0099731 A1 | 7/2002 | Abajian |
| 2002/0099737 A1 | 7/2002 | Porter et al. |
| 2002/0103920 A1 | 8/2002 | Berkun et al. |
| 2002/0104096 A1 | 8/2002 | Cramer et al. |
| 2002/0120501 A1 | 8/2002 | Bell et al. |
| 2002/0138467 A1 | 9/2002 | Jacobson et al. |
| 2002/0138649 A1 | 9/2002 | Cartmell et al. |
| 2002/0143916 A1 | 10/2002 | Mendiola et al. |
| 2002/0152267 A1 | 10/2002 | Lennon |
| 2002/0174147 A1 | 11/2002 | Wang et al. |
| 2003/0018607 A1 | 1/2003 | Lennon et al. |
| 2003/0028654 A1 | 2/2003 | Abjanic et al. |
| 2003/0149975 A1 | 8/2003 | Eldering et al. |
| 2004/0015398 A1 | 1/2004 | Hayward |
| 2004/0015703 A1 | 1/2004 | Madison et al. |
| 2004/0030681 A1 | 2/2004 | Shannon et al. |
| 2004/0030683 A1 | 2/2004 | Evans et al. |
| 2004/0045040 A1 | 3/2004 | Hayward |
| 2004/0051812 A1 | 3/2004 | Hayward |
| 2004/0059632 A1 | 3/2004 | Kang et al. |
| 2004/0064500 A1 | 4/2004 | Kolar et al. |
| 2004/0088328 A1 | 5/2004 | Cook et al. |
| 2004/0107439 A1 | 6/2004 | Hassell et al. |
| 2004/0163101 A1 | 8/2004 | Swix et al. |
| 2005/0038809 A1 | 2/2005 | Abajian et al. |
| 2005/0060742 A1 | 3/2005 | Riedl et al. |
| 2005/0086345 A1 | 4/2005 | Philyaw et al. |
| 2005/0177568 A1 | 8/2005 | Diamond et al. |
| 2005/0187965 A1 | 8/2005 | Abajian |
| 2005/0193014 A1 | 9/2005 | Prince |
| 2006/0010469 A1 | 1/2006 | Reynolds et al. |
| 2006/0031257 A1 | 2/2006 | Lipscomb et al. |
| 2006/0053109 A1 | 3/2006 | Sudanagunta et al. |
| 2006/0277175 A1 | 12/2006 | Jiang et al. |
| 2007/0116425 A1 | 5/2007 | Hatanaka et al. |
| 2007/0130131 A1 | 6/2007 | Porter et al. |
| 2007/0250560 A1 | 10/2007 | Wein et al. |
| 2010/0287159 A1 | 11/2010 | Abajian et al. |
| 2011/0055026 A1 | 3/2011 | Hayward et al. |
| 2011/0246866 A1 | 10/2011 | Abajian et al. |
| 2012/0215599 A1 | 8/2012 | Hayward et al. |

FOREIGN PATENT DOCUMENTS

| | | |
|---|---|---|
| EP | 0867003 | 9/1998 |
| JP | 11-112562 | 4/1999 |
| JP | 2000-059326 | 2/2000 |
| JP | 2000-137667 | 5/2000 |
| JP | 2000-515692 | 11/2000 |
| KR | 2000-0037022 | 7/2000 |
| KR | 2000-0050151 | 8/2000 |
| WO | WO-97/22201 | 6/1997 |
| WO | WO-9722069 | 6/1997 |
| WO | WO-00/43914 | 7/2000 |
| WO | WO-00/48957 | 8/2000 |
| WO | WO-0068839 | 11/2000 |

(56) References Cited

FOREIGN PATENT DOCUMENTS

| WO | WO-0133428 | 5/2001 |
|---|---|---|
| WO | WO-02/056576 | 7/2002 |
| WO | WO-02/057934 | 7/2002 |

OTHER PUBLICATIONS

"Hiwire Ad Serving," Hiwire, 2002. http://www.archive.org/web/200302102061101/hiwire.com/products/ad_serving.html Accessed Apr. 25, 2006, 1 page.
"Rapidly Expanding Graphics Environment", NIKKEI BYTE, Jun. 1, 1995, No. 139, pp. 244-256.
"Section 2 Platform", NIKKEI BYTE, Feb. 1, 1994, No. 122, p. 122-134.
Adding Windows Media to Web Pages, Dec. 31, 2000, pp. 1-7, retrieved from http://msdn.microsoft.com/en-us/library/ms983583%28d=printer%29.aspx on Jun. 27, 2012.
Akanuma, T., "Power-up of Internet Browser," Touch PC, Oct. 24, 2000, vol. 5, No. 10, pp. 50-57.
Anne J. Gilliand-Swetland, Introduction to Metadata Setting the Stage, Jul. 5, 2000, pp. 1-11.
Bowman et al., "The Harvest Information Discovery and Access System," Computer Networks and ISDN Systems, North Holland Publishing, vol. 28, No. 1, pp. 119-125, Dec. 1995.
Chinese Office Acation, Chinese App. No. 200580029532.7, Jan. 6, 2012.
Eberman, et al., Compaq, Indexing Multimedia for the Internet, Cambridge Research Laboratory, Mar. 1999.
Eric Rehm, Representing Internet Streaming Media Metadata Using MPEG-7 Multimedia Description Schemes, 2000, ACM Press, pp. 93-98.
Eric Rehm, Representing Internet Streaming Media Metadata Using MPEG-7 Multimedia Description Schemes, Jul. 2, 2000, pp. 1-14.
European Office Action dated Aug. 17, 2006 in European Patent App. No. 01 989 326.2-2201, corresponding to PCT Application PCT/US01/51227 (3 pages).
European Office Action dated Jan. 31, 2007 in European Patent App. No. 01 989 347.8-2201, corresponding to PCT Application PCT/US01/51227 (5 pages).
European Office Action dated Mar. 27, 2006 in European Patent App. No. 01 989 347.8, corresponding to PCT Application PCT/US01/51373 (3 pages).
European Office Action dated Oct. 24, 2006 in European patent App. No. 01 989 326.2, corresponding to PCT Application PCT/US01/51227 (4 pages).
European Supplemental Search Report; European Patent Application No. 01 989 143.2; filed Nov. 20, 2011; Applicatnt: Thomas Licensing S.A., mailed Dec. 28, 2004 (2 pages).
European Supplemental Search Report; Eutopean Patent Application No. 01 988 150.7; filed Nov. 20, 2001; Applicant: Thomas Licensing S.A. mailed Dec. 28, 2004 (3 pages).
Extended European Search Report EPO App. No. 12 00 3558, Jul. 4, 2012 (6 pages).
Fiedler et al., "Using the Web Efficiently: Mobile Crawlers,"17th Annual International Conference of the Association of Management on Computer Science, pp. 324-329, Aug. 1999.
International Search Report and Written Opinion; International Patent Application No. PCT/US01/51228; filed Oct. 24, 2001; Applicant: Singingfish.com, mailed Mar. 28, 2003 (2 pages).
International Search Report; International Patent Application No. PCT/US01/43305; filed Nov. 20, 2001; Applicant: Kolar et al.; mailed Sep. 9, 2002 (2 pages).
International Search Report; International Patent Application No. PCT/US01/43247; filed Nov. 20, 2001; Applicant: Singfish.com; mailed Apr. 18, 2002 (2 pages).
International Search Report; International Patent Application No. PCT/US01/43303; filed Nov. 20, 2001; Applicant: Singingfish.com; mailed May 15, 2002 (4 pages).
International Search Report; International Patent Application No. PCT/US01/43248; filed Nov. 20, 2001; Applicant: Singingfish.com; mailed May 30, 2002 (2 pages).
International Search Report; International Patent Application No. PCT/US01/43248; filed Oct. 24, 2001; Applicant: Singingfish.com; mailed Jul. 11, 2002 (5 pages).
International Search Report, International Patent Application No. PCT/US01/51227; Filed Oct. 24, 2001; Applicant Singingfish.com, Inc.; Mailed Jul. 30, 2002 (2 pages).
John R. Smith & Shih-Fu Chang, Visually Searching the Web for Content, Jul.-Sep. 1997, pp. 12-20.
Kontothanassis, et al., Compaq, Design, Implementation, and Analysis of a Multimedia Indexing and Delivery Server, Cambridge Research Laboratory, Aug. 1999.
Koster, "Robots in the Web: Threat or Treat?" Available at <http://www.robotstxt.org/wc/threat-or-treat.html>, Apr. 1995.
Mauldin, "Lycos: design choices in an Internet search service," IEEE Expert IEEE USA, vol. 12, No. 1, Jan. 1997, pp. 8-11, IEEE USA.
Max Chittister, Oracle InterMedia Annotator User's Guide Release 1.5, 1999, 2000 Oracle Corporation.
Network Working Group, Dublin Core Metadata for Resource Discovery, Sep. 1998, pp. 1-10.
Office Action for Korean Application No. 10-2003-7005382, corresponding to PCT App. No. US01/51373, mailed Dec. 7, 2007 (5 pages).
Official Action for Japanese Patent Application No. 2002-549056, mailed Mar. 3, 2008 (1 page).
Official Action for Japanese Patent Application No. 2002-557111 mailed Sep. 5, 2007 (English Translation, 1 page).
Official Action for Japanese Patent Application No. 2002-557111, mailed Apr. 9, 2007 (1 page).
Office Action issued in U.S. Appl. No. 11/173,799, dated Sep. 13, 2012.
Parker, Pamela, "Hiwire Unveils Targeted Ad Network for Streaming Media," ClickZ Internet Advertising News, May 16, 2000, http://clickz.com/news/print.php/363911 Accessed on Apr. 25, 2006, 1 page.
Patent Cooperation Treaty, International Preliminary Examination Report, PCT/US01/51228, Mar. 28, 2003 (4 pages).
Podlipnig et al., "A Survey of Web Cache Replacement Strategies," ACM Computing Surveys, vol. 35, No. 4, Dec. 2003, pp. 374-398.
Swain, "Searching for Multimedia on the World Wide Web," Cambridge Research library, Technical Report Series, Mar. 1999 (14 pages).
Taalee Semantic Engine Brochure (23 pages).
Top, Derek, "Turning the Tables with Targeted Ad Insertion," Streamingmedia.com, Mar. 21, 2001, http://www.streamingmedia.com/r/printerfriendly.asp?id=6983, Accessed on Apr. 25, 2006, 8 pages.
USPTO Final Office Action of Sep. 13, 2012, U.S. Appl. No. 11/173,799 (28 pages).
USPTO Final Office Action of Sep. 25, 2007, U.S. Appl. No. 10/415,210 (13 pages).
USPTO Non-Final Office Action of Jan. 3, 2012, U.S. Appl. No. 12/943,724 (12 pages).
USPTO Non-Final Office Action of Jul. 26, 2012, U.S. Appl. No. 13/399,602 (7 pages).
USPTO Non-Final Office Action of Jun. 21, 2007, U.S. Appl. No. 10/415,210 (13 pages).
USPTO Non-Final Office Action of May 3, 2010, U.S. Appl. No. 10/415,210 (12 pages).
USPTO Non-Final Office Action of Nov. 4, 2008, U.S. Appl. No. 10/415,216 (20 pages).
USPTO Non-Final Office Action of Oct. 26, 2010, U.S. Appl. No. 10/415,210 (12 pages).
USPTO Non-Final Office Action of Sep. 1, 2009, U.S. Appl. No. 11/173,799 (30 pages).
U.S. Appl. No. 60/208,954, filed May 31, 2000 (7 pages).
U.S. Appl. No. 60/221,750, filed Aug. 31, 2003 (112 pages).
USPTO Non-Final Office Action of Feb. 28, 2006 under U.S. Appl. No. 10/415,021 (7 pages).
USPTO Non-Final Office Action of May 1, 2007 under U.S. Appl. No. 10/415,021 (18 pages).

(56) References Cited

OTHER PUBLICATIONS

USPTO, Examiner's Answer of Dec. 10, 2007, U.S. Appl. No. 10/415,021 (15 pages).
USPTO, Examiner's Answer of Oct. 26, 2009, U.S. Appl. No. 10/415,021 (13 pages).
USPTO, Final Office Action dated Sep. 14, 2011, U.S. Appl. No. 12/943,724 (11 pages).
USPTO, Final Office Action of Jul. 28, 2006, U.S. Appl. No. 10/415,021 (7 pages).
USPTO, Final Office Action of May 11, 2007, U.S. Appl. No. 10/415,216 (15 pages).
USPTO, Final Office Action of May 11, 2009, U.S. Appl. No. 10/415,216 (20 pages).
USPTO, Final Office Action of Nov. 27, 2009, U.S. Appl. No. 10/415,216 (18 pages).
USPTO, Office Action of Feb. 22, 2011, U.S. Appl. No. 12/943,724 (10 pages).
USPTO, Office Action of Apr. 3, 2008, U.S. Appl. No. 10/415,216 (16 pages).
USPTO, Office Action of Dec. 12, 2006, U.S. Appl. No. 10/415,216 (14 pages).
Wrede, David. "Advertising Solutions: Client-Side Playlist Ad Insert." Microsoft Windows Media Worldwide, Microsoft Corporation, Dec. 2004. <http://www.microsoft.com/windoes/windowsmedia/howto/articles/ad.aspx#ad_topic5>, Accessed Apr. 25, 2006 (6 pages).

* cited by examiner

METHOD OF DISSEMINATING ADVERTISEMENTS USING AN EMBEDDED MEDIA PLAYER PAGE

This application is a continuation of U.S. patent application Ser. No. 13/399,602, filed Feb. 17, 2012 (now allowed), which is a continuation of U.S. patent application Ser. No. 10/415,021, filed Apr. 24, 2003, now U.S. Pat. No. 8,122,236, which claims the benefit under 35 U.S.C. §365 of International Application PCT/US01/51227, filed Oct. 24, 2001, which claims the benefit of U.S. Provisional Patent Application No. 60/242,848, filed Oct. 24, 2000. The contents of the above-referenced applications are expressly hereby incorporated by reference in their entireties.

This invention relates to media players for playing media files, such as audio and video files, and more particularly to embedded or wrapped media players.

"Wrapped" or "embedded" media players have become popular for providing content along with a media player application. A media player is an application that outputs audio and video files that are either stored locally in a multimedia device, or are streamed/downloaded from a remote storage site via a communications interface. A wrapped or embedded media player is a viewed application embedded within a data display. Examples of data displays being web pages, electronic programming guides, and other software applications creating graphical compositions. The data display code may include scripting that calls a media player, resident on a client, as an object for embedding within the data display. Alternatively, a functional media player applet may accompany a data page download, and the data page is configured to embed the media player generated by the applet.

Many content providers employ this embedded technique because the surrounding Web page offers advertising and branding space as a means to monetize the media experience. Known embedded media player pages that embed media players, however, suffer from several drawbacks. First, and particularly with respect to streamed video content, prior embedded media player pages generally display all video data at one size, causing the image composition to be cropped by the fixed size of the video display area. This is particularly a problem with Synchronized Multimedia Integration Language (SMIL) files that are hypertext markup language (HTML) like files that use the Extensible Markup Language (XML) syntax for bundling video, audio, text, graphic images and hyperlinks. SMIL files may not present to a user all of the available screen content if the presentation of the files is cut short by standard cropping techniques. Otherwise, a user has to manually adjust the embedded media player to the size of a video display.

In addition, while a user may view or listen to a media file played by an embedded media player, any bookmark created by the user using a browser typically points to the media file itself. Bookmarking directly to the media file bypasses the content of the embedded media player page and prevents the generation of revenue from advertising content and branding exposure during subsequent playbacks of the media file by the user.

Still further, collecting data from the use of an embedded media player could help content providers in gauging audience interest. For example, known embedded media player pages do not collect data indicating whether a user allowed a media file to play through to completion or closed an embedded media player page prior to completion of the playing of the media file. Also, data is not generated that indicate whether a user has left an embedded media player page open after completion of the playing of a media file. Such information may be used to evaluate the popularity of a media file, the relevance of a media file to a search query (when the file is identified to the user as a result of a search), and to identify the interest level of users with respect to content that surrounds an media player embedded within a web page.

A method of disseminating advertisements includes the step of transmitting to a media device an embedded media player page for playing a media file. The embedded media player page allows a user of the media device to create a bookmark for a browser. The bookmark points to the embedded media player page. The bookmark includes an address of the media file as a parameter. When the bookmark is used in the browser to play the media file, the embedded media player page instructs the media device to request an advertisement from an advertisement server for display in the embedded media player page. The method provides user exposure to the advertisement each time that the bookmark is used in the browser.

BRIEF DESCRIPTION OF THE DRAWINGS

The accompanying drawings illustrate preferred embodiments of the invention as well as other information pertinent to the disclosure, in which.

As used herein, the following terms are defined:

"Script"—generally a short program written in an interpreted language such as Perl or Java and usually providing instructions for data and browser management;

"Scripting"—server or client-side programming which supplements a static HTML page, usually written in languages such as Perl, Java, JavaScript, and sometimes used in combination with Common Gateway Interface (CGI) scripts.

The Internet is a worldwide system of computer networks—a network of communication networks in a user at one computer can obtain information and communicate with a user of another computer, connected to one of the communication networks. The most used part of the Internet is the World Wide Web (often-abbreviated "WWW" or called "the Web"). One of the most outstanding features of the Web is its use of hypertext, which is a method of cross-referencing information. In most Web sites, certain words or phrases appear in text of a different color than the surrounding text, indicating that such terms may be links to other websites. These links identify other resources on the Internet via the use of a tag called a Universal Resource Indicator (URI) or Universal Resource Locator (URL), for example http://www.yahoo.com is a URI identifying a web page located at yahoo.com. Sometimes, there are buttons, images or portions of images that are "clickable." Using the Web provides access to millions of pages of information. Web "surfing" is done with an Internet browser; the most popular of which presently are Netscape Navigator and Microsoft Internet Explorer. The appearance of a particular website may vary slightly depending on the particular browser used. Some browsers have "plug-ins," which provide animation, virtual reality, sound, video, and other forms of multimedia.

Figure 1:
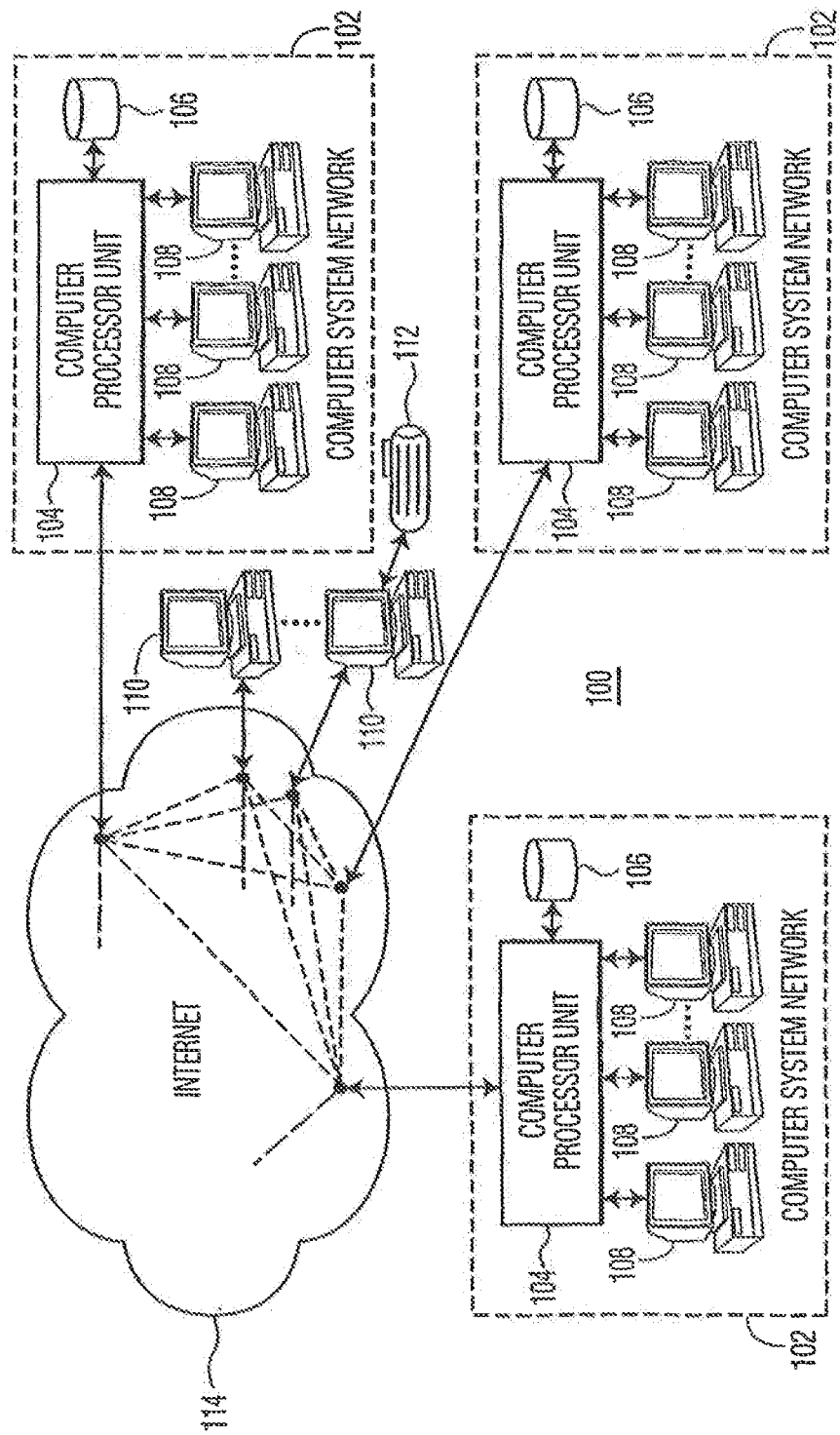
FIG. 1 is a stylized overview of a system of interconnected computer networks.

Referring to FIG. 1 there is shown a stylized overview of a system 100 of interconnected computer system networks 102. Each computer system network 102 contains a corresponding local computer processor unit 104, which is coupled to a corresponding local data storage unit 106, and local network users 108. Computer system network 102 may be a local area network (LAN) or a wide area network (WAN) for example. Local computer processor units 104 are selectively coupled to plurality of clients 110 through Internet 114 described above. Each of the plurality of clients 110 may have various multimedia devices connected to their local computer systems, such as scanners, bar code readers, printers, and other interface devices 112. Client 110, programmed with an Internet browser, locates and selects (such as by clicking with a mouse) a particular Web page, the content of which is located on local data storage unit 106 of computer system network 102, in order to access the content of the Web page. The Web page may contain links to other computer systems and other Web pages.

Client 110 may be a computer terminal, a pager that can communicate through the Internet using the Internet Protocol (IP), a Kiosk with Internet access, a connected electronic planner (e.g., a PALM device manufactured by Palm, Inc.) or other device capable of interactive Internet communication, such as an Internet enabled television. Client 110 may also be a wireless device, such as a hand held unit (e.g., cellular telephone) that connects to and communicates through the Internet using the wireless access protocol (WAP) or a third generation (3G) compatible protocol.

Figure 1A:
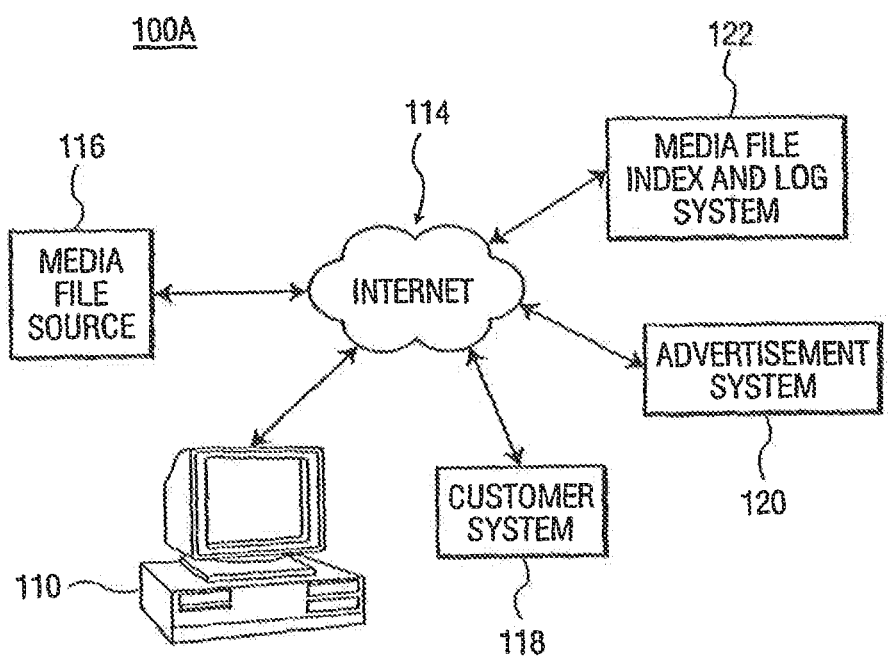
FIG. 1A is a stylized overview of a system for providing an exemplary embedded media player page to a client.

FIG. 1A is a stylized overview of system 100A for providing an exemplary embedded media player page to client 110. System 100A generally utilizes the Internet structure described above in connection with system 100. System 100A preferably includes plurality of clients 110 connected to Internet 114. The system 100A also includes at least one media file source 116 which may be configured as computer system network 102 (FIG. 1). In any case, the media file source 116 is accessible through Internet 114 and provides at least one media file through Internet 114 for playing on client 110.

As used herein, the term "media file" includes audio, video, textual, interactive and multimedia data files, and includes "streaming media files." is Streaming media files include audio, video, multimedia, textual and interactive data files that are typically delivered over the Internet or other network environment to a client and playback on the client begins before delivery of the entire file is completed. This enables the stream to be played as quickly as possible without the user having to wait for a complete download. There is almost an unlimited variety of media content including songs, political speeches, news broadcasts, movie trailers, and playable animations.

Millions of media files already exist and are available from media file sources 116 through the World Wide Web. Many of these media files comporting to a streaming media file format. While a variety of streaming media file formats exist, the vast majority of streaming media files have been encoded as either REALAUDIO™, REALVIDEO™, MICROSOFT WINDOWS MEDIA FORMAT™, FLASH™, APPLE QUICKTIME™, MPEG-2 Layer III Audio, and MP3. Certain files, such as MP3 files and QUICKTIME™, can be used as both streaming (not completely received) and downloaded (completely received) files.

The system 100A also includes at least one customer system 118, at least one advertisement system 120, and at least one media file index and log system 122. Each system 118, 120, and 122 are connected to Internet 114 and may be configured as computer system network 102 described above in connection with FIG. 1. Each system is described below in detail in connection with a description of an exemplary embedded media player page. As used hereafter, "embedded media player page" refers to both the underlying code that directs the display of content by a browser and instructs the client to take certain actions and the content actually displayed as a Web page in a browser window.

Before the details of an exemplary embedded media player page are described, one preferred method of providing the embedded media player page is described. A user of client 110 accesses customer system 118 through Internet 114 using an Internet browser in a manner described above. Customer system 118 transmits a web page to client 110 through Internet 114. Customer system 118 may be, for example, a Web portal site, which provides access to a wide is variety of information through a common interface centralized in a location, e.g., sports news, world news, weather information, travel information, etc. Although customer system 118 is described herein as a Web portal site, it should be understood that this is in no way a requirement, and customer system 118 may provide any manner of content or services, for example, customer system 118 may provide audio broadcasts streamed from radio stations that are selected from the portal site:

The Web page transmitted to client 110 from customer system 118 includes a media file search prompt. Any phrase, icon, or the like which is "clickable" or which accepts an input from a user may be considered a prompt for the user to make a selection. Providing the user with two "clickable" alternatives is essentially the equivalent of directly prompting the user with a textual prompt to make a selection, e.g., "Please select A or B." Generally, the media file search prompt may be configured as a search window (as is common with many search engines) and prompts the user to enter search criteria for a media file, such as a streaming audio or video file. The search criteria are transmitted to customer system 118, which then transmits the search criteria through Internet 114 to media file index and log system 122. Customer system 118 may license these search capabilities or otherwise obtain the search capabilities from an entity that populates the media file index and log system 122.

Media file index and log system 122 includes a database having indexed therein a plurality of media files. The database of media files preferably does not include media files themselves, but rather includes data identifying media files that are available from the plurality of media files sources 116 in system 100A. Examples of data stored for each respective media file indexed to within the database include the Web address of the media file, such as in the form of a URI or URL referring to the media file, the playing length of the media file (i.e., the amount of time it takes a media file to play in a media player from beginning to end), a unique identifier for the media file, and the type of media file (SMIL file, audio file, video file, REALAUDIO™ file, WINDOWS MEDIA™ file, etc.). The database may also include description data describing the content of each indexed media file, and the database may be populated using conventional search engine techniques known to those of ordinary skill. One known technique utilizes a program, called a "robot" or "spider", which pre-traverses a network in search of documents (e.g., web pages) and builds large index files of keywords found in the documents. As an example, description data for an audio file may identify whether the audio data is musical in nature, the title of a song, the artist, the type of music, copyright data, etc.

Media file index and log system 122 transmits search results through Internet 114 to customer system 118, such as in an XML format. Customer system 118 converts the XML results to an HTML (hypertext markup language) format and transmits the results to client 110 as a Web page that preferably includes a list of links to media files located at media file sources 116, satisfying a user's search criteria. As an example, a user at client 110 may enter a search request for "Pearl Harbor" and "movie trailer". The search request is received by customer system 118 and is transmitted to media file index and log system 122, which then searches local and remote databases for indexed media files that satisfy the search request Assuming five streaming video files are indexed that meet the user's search request, media file index and log system transmits the results to customer system 118. These results may include the playing length of each video file, the URI address of each video file, encoding bit rate of the video file, file format, a database identifier unique to each video file, frame dimensional data for each video file, or any other information contained within the database. The customer system 118 then transmits the search results in a customized HTML page to the client 110 for display to the user using a browser of a client 110.

The user of the client 110 may then decide to view the video data contained within a video file listed in the search results displayed to the user by clicking a link to one of the video files. When the user "clicks" on a link to a selected video file, a script file, such as a JavaScript file, transmitted to the client from the customer system 122 instructs the client to request the embedded media player page from the customer system 122. The details of the embedded media player page are described below.

It should be understood that FIG. 1A shows individual systems as separate functional blocks for illustrative purposes only, but some or all of the illustrated and described functions may be combined physically within one or more systems. For example, a customer system 118 may also provide the functions of an advertisement system 120.

Figure 2:
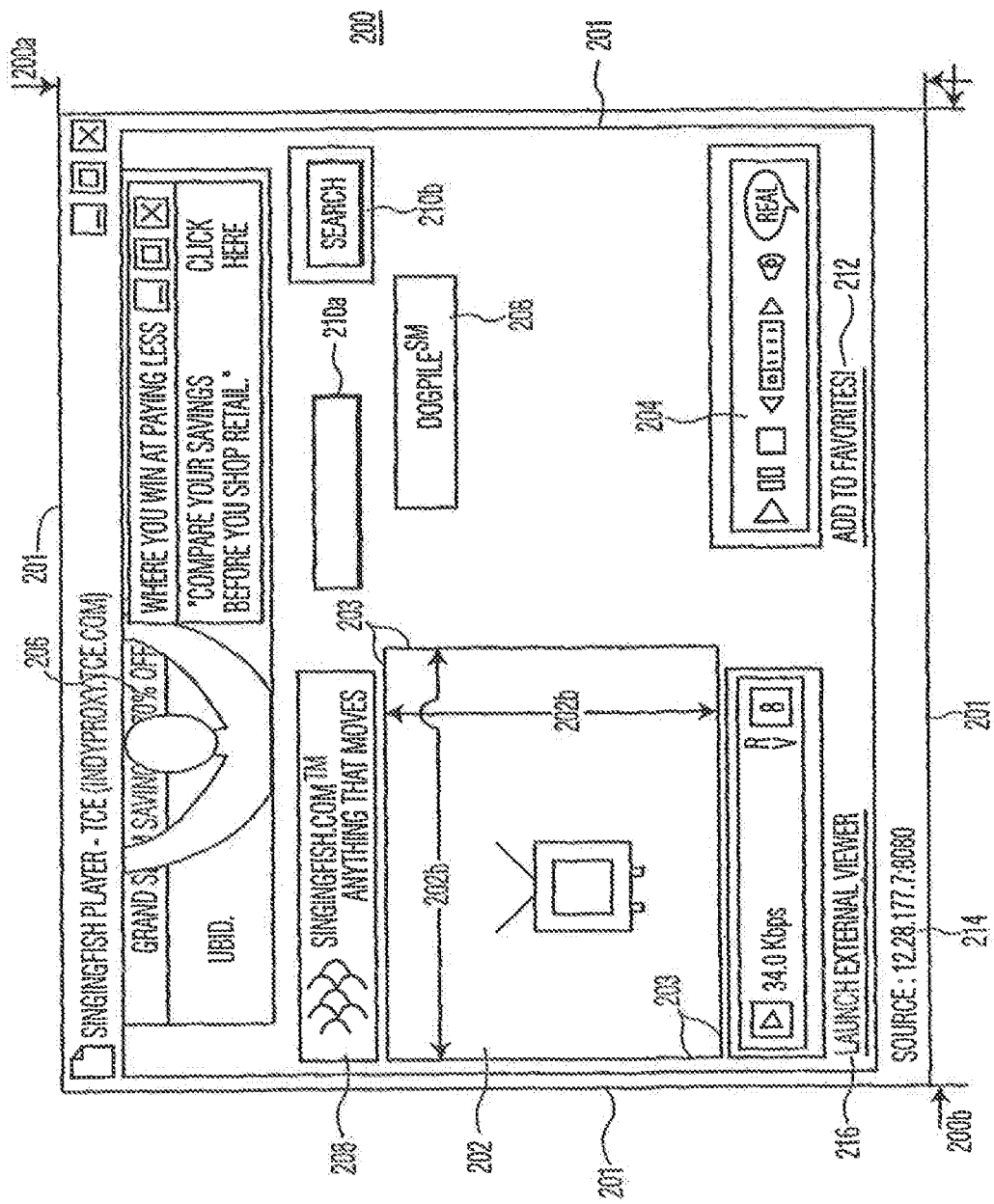
FIG. 2 is an illustration of a browser window displaying an exemplary embedded media player page.

FIG. 2 is an illustration of an exemplary embedded media player page transmitted from customer system 118 through Internet 114 and displayed to the user by a client 110. Embedded media player page includes a reference to a functional media player object (such as a RealPlayer plug in). A reference is a tag (as a file locator as a universal resource indicator, URI, URL, or a file/object accessed through a directory structure) that refers to file, media object, or executable computer code stored in a memory structure. The media player object generally is resident on the client, although the reference tag could trigger a download of a media player applet to control the output of a media file. Embedded media player page also includes a reference through a URL to one or more advertisements to be provided by at least one advertisement system 120 for display. Embedded media player page may also include a reference to one or more branding logos to be displayed. The reference to the branding logos may also be a URL address of a graphics file available from customer system 122 or computer system 102. The graphics file may be in a graphics file format as a graphic interchange format (GIF), or another type of compressed/decompressed graphic file format. Embedded media player page may also include a search query input form (e.g., a search window) and clickable search command button. The above references and features may be contained within an HTML frameset.

Figure 3:
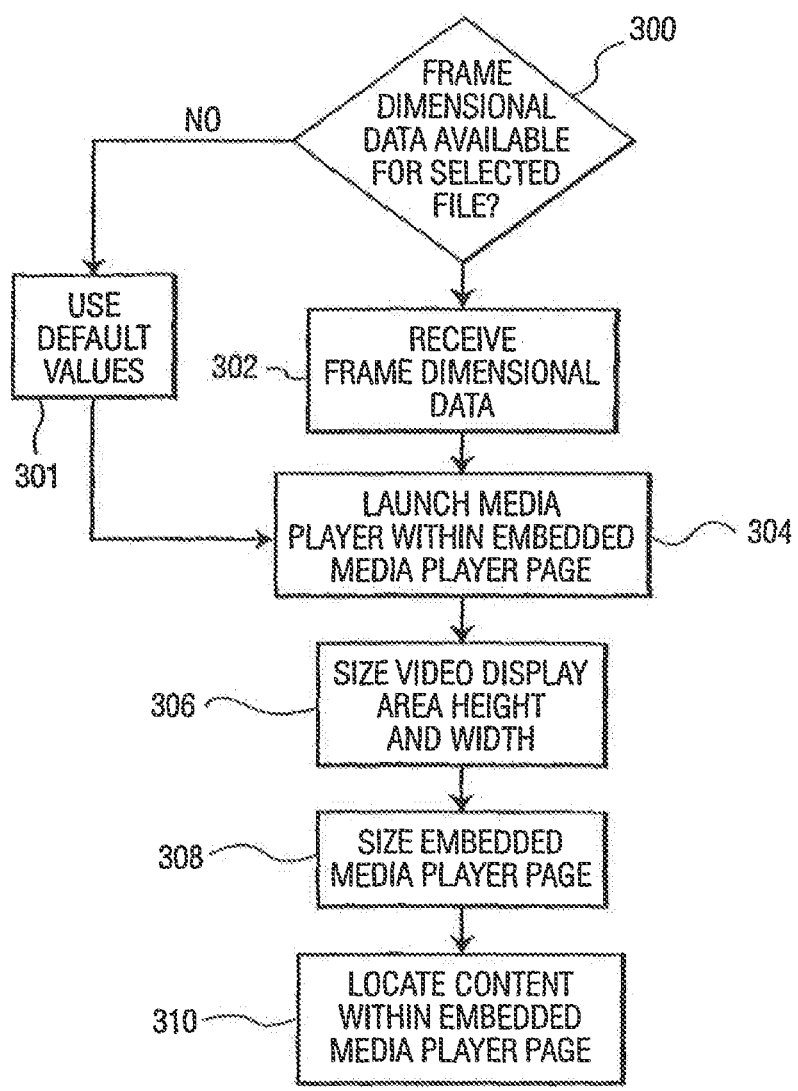
FIG. 3 is a flow diagram illustrating a method of sizing an exemplary embedded media player page.

Referring to FIG. 2, the embedded media player page is shown in a pop-up window 200 generated by a browser, such as Microsoft Internet Explorer, of a client 110. The embedded media player page includes video display area 202 (when the embedded player plays video files) and control 204 for controlling the output of a media file. Exemplary control 204 includes a play button, pause button, stop button, slider bar, forward and rewind, buttons, and a status window for displaying buffer status information relevant to streamed files. An autosizing feature of an exemplary embedded media player page is described hereafter in connection with FIGS. 2 and 3.

If frame dimensional data for a selected video file is available at step 300, i.e., if it is available in media file index and log system 122, embedded media player page receives at step 302 frame dimensional data for the video file selected for playing by the user. In one embodiment, the frame dimensional data is transmitted to customer system 118 from media file index and log system 122 and is forwarded to client 110 along with search results (if the frame dimensional data is available from media file index and log system 122). When the user selects a video file for viewing, the embedded media player page is transmitted from the customer system 118 to the client 110. Embedded media player page can then utilize frame dimensional data forwarded to client 110 as described above. Alternatively, frame dimensional data can be forwarded along with the embedded media player page to client 110, once the user makes a video file selection that prompts the transmission of the embedded media player page to the client 110. If frame dimensional data is not available, embedded media player page uses default values at step 301 that are transmitted along with the embedded media player page. It has been found that default values of approximately 780 pixels for the width 202b of a video display area 202 and 348 pixels for the height 202a of a video display area are generally appropriate, although other values may certainly be utilized.

Frame dimensional data preferably include a frame height value and a frame width value for the video file that is to be played with the embedded media player page. These values may identify the total number of pixels in the height of an individual frame in the video data of the video file and the total number of pixels in the width of an individual frame in the video data of the video file. The media player is called as an object by the embedded media player page when launched (i.e., operated or run) within the embedded media player page at step 304. At step 306, the height 202a and width 202b (FIG. 2) of the video display area 202 are dynamically sized based upon the received frame dimensional data or the default dimensional value (if the frame dimensional data for the video file is not available at step 300).

By dynamically sizing the video display area 202 based upon the frame dimensional data, the video file data (e.g., the picture) is displayed at its intended dimensions or at a scale thereof as appropriate. Particularly with respect to SMIL files, the video data is displayed in an uncropped form, in contrast to prior embedded player pages, which crop video data, often making the video data un-viewable or at least unsatisfying.

At step 308, the dimensions of the pop-up window 200 in which the embedded media player page is displayed are sized based upon the frame dimensional data, and, therefore, based in part upon the sizing of the video display area 202. The pop-up window 200 is sized to accommodate the dynamically sized video display area 202, control 204 and any other content of the embedded media player page. For example, the height 200a and width 200b of the pop-up window 200 may be sized based upon a predefined rule relating the dimensions 200a, 200b of the pop-up window to the dimensions 202a, 202b of the video display area 202. In one exemplary embodiment, a JavaScript file associated with the embedded media player page (i.e., transmitted along with the embedded media player page to the client 110) adjusts various attributes of the pop-up window 200, such as the HSPACE, BORDER and/or VSPACE attributes of a Microsoft Internet Explorer browser window, according to the predefined rule.

An exemplary embedded media player page also includes content displayed along at least one edge 203 of the video display area 202. This content may include, for example, advertisements 206, branding logos 208, a search window 210*a* and search command button 210*b*, to name a few types of content. This content is dynamically located within the embedded media player page at step 310. The dimensions of the player page, and therefore, of the pop-up window 200, may be sized to leave sufficient margin for the content between at least one edge 203 of the video display area 202 and the edges 201 of the pop-up window 200.

Again, the positioning of this content relative to the edges 201 of pop-up window 200 and the edges 203 of the video display area 202 may be determined based upon a predefined rule, such as one that, for example, centrally locates a branding logo 208 between a selected edge 203 of the video display area 202 and a selected edge 201 of the pop-up window 200, or that centrally locates an advertisement 206 between two opposite edges 201 of pop-up window 200. Controls 204 may similarly be located. A predefined rule may even dynamically position content in relation to different edges 201, 203 based at least in part on the frame dimensional data. For example, if the frame dimensional data dictates a particularly large width 202*b* for the video display area, and a determination has been made that extremely wide pop-up windows are unattractive or cumbersome, selected content can be located above or below the video display area 202 rather than along a side edge 203 or edges 203 of the video display area 202.

Search window 210*a* and search command button 210*b* allow the user to request a search for media files, such as video files, indexed within media file index and log system 122. The search results may be displayed to the user in the original search results page described above. The user may then launch another embedded media player page in a second pop-up window by selecting a media file as described above. A media type checkbox grid (not shown) may also be displayed in the embedded media player page for allowing the user to limit a search to a particular media type, such as WINDOWS MEDIA files or MP3 files.

As mentioned in connection with FIG. 1A, the embedded media player page includes a reference to one or more advertisements to be provided by at least one advertisement system 120 for display as content within the embedded media player page. An example of an ad reference which instructs a client to request advertisements for inclusion in the embedded media player page is: <IMGSRC=http://theadservercompany.com/ad.GIF>. The IMGSCR command identifies a file named "ad.GIF" (located at theadservercompany.com) as a screen image that is to be displayed within the embedded media player page.

The media player located in an embedded media player page supports the type of media that a regular media player. Preferably, the embedded media player reference video files (or other media file as appropriate in a non-video context), such as a SMIL streaming file, for playback. The embedded media player also supports the display of an advertisement (second video file or image), streamed from a secondary source. The streamed advertisement may be optionally adjusted in accordance with the sizing of the video file. Also, the streamed advertisement is selected in reference to the video file. For example, an HTML code is sent from customer system 118 to client 110 (the example referring to FIGS. 1 and 2):

```
< EMBED TYPE = "application/x-mplayer2"
  NAME = "MediaPlayer"
  SRC = "http://thestreamhost.com/thestream.asx"
  WIDTH = 400 HEIGHT = 320 > < /EMBED >.
```

The command "EMBED TYPE" is a MIME based command that tells client 110 to embed media player "x-mplayer2" in a web page as shown in pop-up window 200. The client 110 executes the embedded media player and entitles the pop-up window 200 "MediaPlayer" from the NAME command. A file entitled "thestream.asx" is found and streamed by the media player from a media file source 116 located at "thestreamhost.com" through Internet 114 via a SRC command. The file "thestream.asx" is outputted by the embedded media player in a window 202 sized at 400 horizontal pixels by 320 vertical pixels, as determined by the WIDTH and HEIGHT commands, Customer system 118 optionally transmits additional HTML code to client 110 for displaying an advertisement:

```
< ADSERVER TYPE = "VIDEOSTREAM"
  STREAMSOURCE = "http://adserver.adsite.com/adspace.asx"
  WIDTH = 100 HEIGHT = 80 > (/ADSERVER >.
```

The command "ADSERVER TYPE" instructs the embedded media player that it will be accessing a video based advertising server. The embedded media player locates and requests a streaming media file "adspace.asx" from an advertisement system 120 at "adserver.adsite.com". The streaming media file is streamed to client 110 and outputted by the embedded media player in window 206, which utilizes a pre-assigned area for displaying streaming media and static (still picture) advertisements, Customer system 118 instructs client 110 via HTML code to display the streaming media file in a window 206 that is 100 horizontal pixels by 80 vertical pixels. The size of the advertisement window may be selected in accordance with the size of video file (as described above) via use of a sizing algorithm. In this example, customer system 118 divides the pixels allocated for the horizontal and vertical pixels by 4 (400/4=100, 320/4=80). This process defines a 100 horizontal pixel by 80 vertical pixel area for window 208 to display the streaming media advertisement. Client 110 may adjust the size of areas of windows 202 and 206 if pop-up window 200 is modified or resized.

Referring again to FIG. 2, embedded media player page may also include a hyperlink 214 to the media file at a media file source 116. This allows a user to directly link to the media file for playback and bookmarking purposes. Bookmarks typically associate to a location of a web page or a file, by storing the URI or URL of the corresponding web page or file. The association of an embedded media player with a bookmark may provide a user with a better means of accessing media at a specific location, than if accessed without a bookmark. For example, the playback of an MP3PRO™ media file located via a bookmark is optimized by using an embedded media player (that is MP3PRO™ compatible, an associated player with the bookmark) instead of a standard MP3 player (enabled as a default media player). Also, the embedded media player may associate a specific advertisement with a bookmark. For example, a person playing a media file with a bookmark enabling a REALAUDIO™ player would receive a different advertisement than a bookmark enabling a QUICKTIME™ player, for the same media file.

Additionally or alternatively, an exemplary embedded media player page provides the user with an "add to favorites"

option, such as through "clickable" option 212. As explained hereafter, this "add to favorites" option provides for an exemplary method of disseminating advertisements in order to provide additional advertising revenue opportunities each time that a user revisits a media file, whether it be an audio, video, textual, or multimedia file, streaming or other transport file scheme. It should be apparent that an embedded media player page calls as a reference an audio player when the media file is strictly an audio file. In that case, embedded media player page of FIG. 2 would not include video display area 202, but would include appropriate controls 204 and other features specific to audio players that should be familiar to those of ordinary skill.

Figure 4:
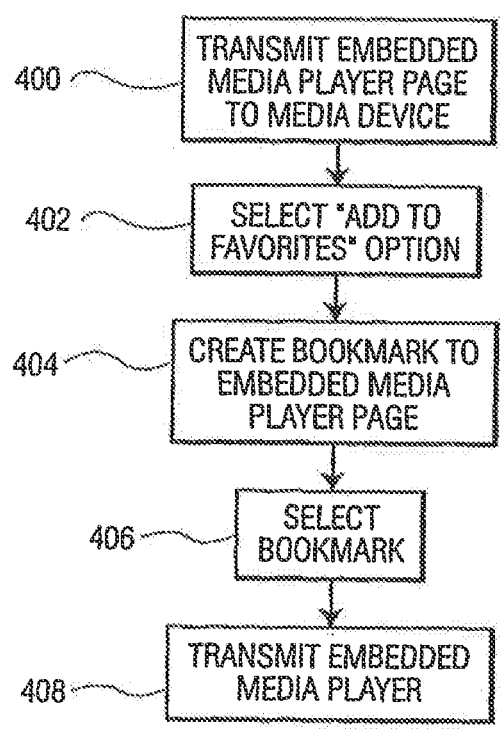
FIG. 4 is a flow diagram illustrating a method of disseminating advertisements using an exemplary embedded media player page.

Referring to FIG. 4, embedded media player page including the "add to favorites" feature is transmitted to client 110 at step 400 for playing a media file, such as a media file selected by a user of client 110 from a search results page as described above. At step 402, a user selects the "add to favorites" option presented by the embedded media player page. A bookmark for an Internet browser, such as Microsoft Internet Explorer, used by the client 110 is then created at step 404 to the embedded media player page that was displayed to the user, rather than directly to the played media file. The bookmark points to embedded media player page, such as through a URI or URL address, and includes an address of the played media file as a parameter. An example of a bookmark may be as follows:—http://theCustomer.com/player/player_fset.html?http://www.recordarchive.com/reel_audio/lies.ram&cp=2000+Mercury&spk=2113761124&rmp—. The first part of the URL (theCustomer.com/player/player_fset.html) is the address of the standard embedded media player page at a customer system 118. After the "?", the bookmark includes parameters specific to the media file, such as the address of the media file at a media file source 116 (http://www.recordarchive.com), media player type (real_audio), copyright information (lies.ram&cp=2000+Mercury), and media file identification number (2113761124&rmp). The media file identification number is a unique identifier associated with the media file from the media file index and log system 122 that may used to authenticate whether a user should have access to a file. The embedded media player page transmitted from a customer system 118 to client 110 includes all of the HTML code and frameset which are relatively constant each time the embedded media player page is transmitted from the customer system 118 to a client 110, but the embedded media player page relies on parameters for that which is to be different each time the embedded media player page is to be displayed by a client 110, such as which media file is to be played by the embedded player.

A bookmark typically includes the information necessary to cause client 110 to display the embedded media player page for playing a media file when a user in step 406 selects the bookmark, referring to the media file. When the user selects the bookmark, the client 110, through a browser, uses the URL address of the bookmark to launch the embedded media player page. Like step 400, the embedded media player page is again transmitted to client 110 for playing the media file, which is identified as a parameter in the bookmark. The other content included within the embedded media player page, and defined by the embedded media player page references and frameset, is also displayed.

As described above, the reference to an advertisement system 120 in the embedded media player page instructs client 110 to request, such as through an HTTP request, at least one advertisement from at least one advertisement system 120 for display in the embedded media player page. Therefore, the bookmark, by pointing to the embedded media player page rather than the media file, creates additional opportunities for advertisement and branding impressions with users. These impressions provide additional revenue opportunities associated with the advertisements and brandings. These additional impressions and revenue opportunities would not be available if the bookmark pointed directly to a media file from a media file source 116. A script file associated with the embedded media player page, such as a JavaScript file, is may create this bookmark.

Figure 5:
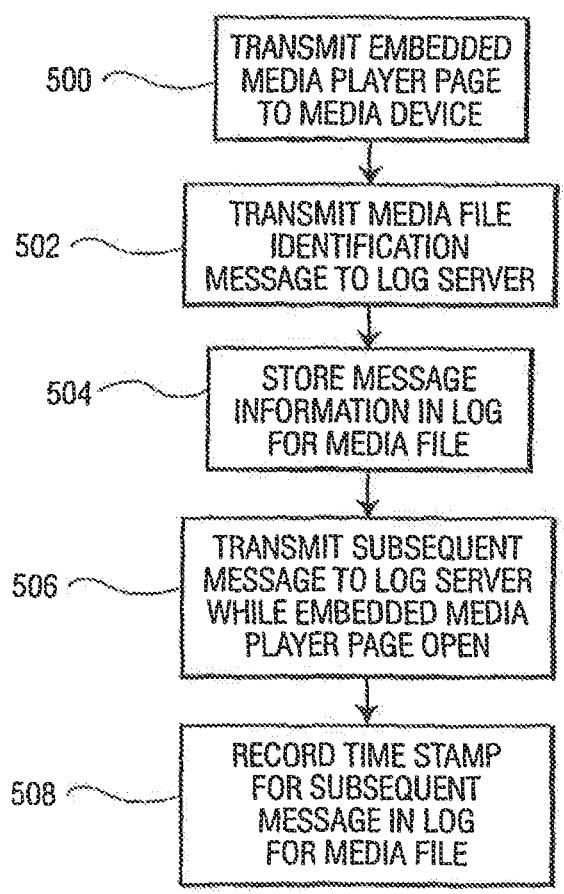
FIG. 5 is a flow diagram illustrating a method of collecting data using is an exemplary embedded media player page.

A explained below, an exemplary embedded media player page also facilitates the collection of data in connection with the playing of a media file. Referring to FIG. 5, an embedded media player page is transmitted at step 500 to client 110 for playback of a media file. As explained above, a client 110 may in response to a selection of a media file by a user from a search results page display this step to the user. The step may also be in response to a selection of a bookmark pointing to an embedded media player page as described above in connection with FIG. 4.

At step 502, the embedded media player page instructs the client 110 to transmit a media file identification message to a log server of media file index and log system 122. This request should at least identify to the log system 122 the media file that is to be played for the user by the embedded media player page. An exemplary media file identification message includes the Internet Protocol (IP) address of the user, typically the IP address or Universal Resource Locator of client 110, the domain address of the customer system 118 that transmitted the embedded media player page to the client 110, a unique identifier for the media file (such as a unique identifier of the media file used in the media file index and log system 122 and received along with a search results page), any search query that caused the media file to be provided to the user as a selection in a results list of a search results page, and the ranking (if any) of the media file within the search results list of a search results page, and a session identifier indicating the communication thread between client 110 and customer system 118. The media file index and log system 122 preferably maintains a respective log for each indexed media file. The log server records that the media file has been selected for playing by a user, preferably by storing at step 504 the information contained within the media file identification message in the media file's respective log. The log may be maintained as a portion of a database 106. The log server may record the time that the media file identification message was received, but the media file identification message preferably includes time data, such as a time stamp, retrieved from the client and identifying the time at which the media file identification message was transmitted.

The media file identification message is preferably transmitted to the media file index and log system 122 substantially proximate in time to when the media file begins to play in the embedded media player of the embedded media player page, particularly in the case of streaming media files which are typically buffered for a period of time before play begins, but this particular timing is not a requirement. In one exemplary embodiment of the embedded media player page, the media file identification message takes the form of an HTTP request to the media file index and log system 122 for a one-pixel GIF file. A one-pixel GIF is simply a one pixel by one pixel transparent image that is referenced by the embedded media player page. The one-pixel GIF is returned to the client as a standard HTTP response. The one-pixel GIF is transparent to the user when displayed in the embedded media player page. The above identified information contained within the media file identification message can be appended to the HTTP request sent by the client for the GIF file. The HTTP request can then be stored in a server log, and the information can then be retrieved and organized within a database for processing and analysis. The HTTP request may, alternatively, be made to another system, such as an advertising system 120. The logs of each advertising system 120 may then be combined and evaluated.

The embedded media player page also preferably includes scripting to instruct the client 110 to transmit at least one subsequent message at step 506 while the embedded media player page remains open. The subsequent message is transmitted to the log server of the media file index and log system 122. The embedded media player page preferably includes scripting that instructs the client 110 to transmit a message at predetermined time intervals while the embedded media player page remains open. By "open," it is meant that the embedded media player page is displayed by a browser, such as in pop-up window 200. At step 508, a time stamp for the at least one subsequent message is stored in the log associated with the media file.

In an exemplary embodiment of the embedded media player page, the subsequent messages are also HTTP requests for one-pixel GIF files, and a time stamp retrieved from client 110 is appended to each request. These subsequent requests may occur, for example, each time that the embedded media player page instructs the client to request a new advertisement for display from an advertisement system 120, although other periodic intervals may also be used. In one exemplary embodiment, these advertisements are requested approximately every thirty seconds while the embedded media player page is open. If the embedded media player page includes scripting to request a new advertisement ever thirty seconds, for example, then a new entry is added to the log for the media file approximately every thirty seconds for as long as the embedded media player page remains open.

The media file index and log system 122 preferably indexes and maintains logs for a plurality of media files. When the logs maintained by the media file index and log system 122 are populated with sufficient data, this data can be processed, such as with a software program operating at media file index and log system 122, to provide valuable information. For example, the total number of times (or total number of times over a selected time period) that each media file indexed in the media file index and log system 122 has been selected for playback a user of an embedded media player page provided by customer system 118 can be identified from the logs. This information provides raw popularity data and allows for the ranking of the popularity of media files that are indexed in the media file index and log system 122, based at least in part on the ranking results.

Further, the media file index and log system 122 preferably includes data identifying the playing time of each indexed media file. By comparing the known playing time against the data in the log server for the media file, specifically the time stamps in the log, much information can be gleaned about the user and the playing event. For example, by calculating the difference in time between the first and last time stamps for a media file during a selected playing session recorded in the log, the approximate length of time that the embedded media player page was left open by the user can be calculated. Comparing this approximate length of time with the playing length of the media file can identify whether the embedded media player page was left open after the playing of the media file ended or whether the embedded media player page was closed before the entire media file was played.

If the embedded media player was left open for any extended period of time after the playing of the media file ended, it may be deduced that the media file played unattended or that the content of the media file was peripheral to the user's attention. In that case, the other content of the embedded media player page may have been most important to the user. This fact also indicates that additional advertising impressions were made on the user if the embedded media player page is configured to instruct the client 110 to request new advertisements at periodic intervals while the embedded media player page is open. Identifying that the embedded media player page was closed before the media file played to completion may identify how pertinent or relevant a played media file was to a user's initial search request, for example. This information, in turn, may be used to evaluate the description data contained in a searchable database that describes the content or other characteristics of an indexed media files and/or to evaluate the methods used to populate that database. The embedded media player page, therefore, provides access to a media file while advantageously creating another product—popularity and relevance metrics possibly generated at location of the media player.

In another embodiment of the embedded media player page, a user is prompted to evaluate a played media file, such as by rating the media on a numerical scale. In this embodiment, the embedded media player page instructs the client 110 to transmit the rating information that is provided by the user to the media file index and log system 122, where it may be processed and evaluated.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although various embodiments have been illustrated, this is for the purpose of describing, and not limiting the invention. Various modifications will become apparent to one skilled in the art and are within the scope of this invention described in the attached claims

The invention claimed is:

1. A computer-implemented method of data collection, comprising:
   receiving, from a media device, a request for at least one media file;
   transmitting, to the media device, information defining an embedded media player interface for playing the at least one media file, wherein the embedded media player interface includes:
      a media file reference to an address for retrieving the at least one media file from a media file source;
      at least one advertising media reference to an address for retrieving at least one advertisement from an advertisement system, and instructions, usable by the media device, for transmitting at least one media file identification message to a remote system; and receiving, from the media device, the at least one media file identification message for recordation in a log associated with the at least one media file.

2. The method of claim 1, wherein the at least one media file identification message is received at predetermined time intervals.

3. The method of claim 2, further comprising:

determining, based on the number of received media file identification messages, a length of time that the media file was displayed.

4. The method of claim 3, further comprising:

determining, if the length of time that the media file was displayed exceeds the length of the media file by an extended period of time, that the media file was displayed unattended.

5. The method of claim 1, wherein the request for at least one media file is associated with a search query from the media device, and wherein the method further comprises processing the log associated with the at least one media file to determine the relevance of the media file with respect to the search query.

6. The method of claim 1, wherein the media file and the advertisement are adapted for display within the embedded media player interface, and wherein the at least one media file identification message includes a request for a new advertising media reference.

7. The method of claim 1, wherein the at least one media file identification message includes rating information provided by the user about the media file.

8. A computer system for data collection, comprising:

at least one processor; and a non-transitory tangible computer-readable medium storing program code segments, the program code segments configured to cause the at least one processor to perform the following operations:

receiving, from a media device, a request for at least one media file;

transmitting, to the media device, information defining an embedded media player interface for playing the at least one media file, wherein the embedded media player interface includes:

a media file reference to an address for retrieving the at least one media file from a media file source;

at least one advertising media reference to an address for retrieving at least one advertisement from an advertisement system, and instructions, usable by the media device, for transmitting at least one media file identification message to a remote system, the at least one media file identification message identifying the referenced media file; and receiving, from the media device, the at least one media file identification message for recordation in a log associated with the at least one media file.

9. The system of claim 8, wherein the at least one media file identification message is received at predetermined time intervals.

10. The system of claim 9, wherein the program code segments are further configured to cause the processor to perform the following operation:

determining, based on the number of received media file identification messages, a length of time that the media file was displayed.

11. The system of claim 10, wherein the program code segments are further configured to cause the processor to perform the following operation:

determining, if the length of time that the media file was displayed exceeds the length of the media file by an extended period of time, that the media file was displayed unattended.

12. The system of claim 8, wherein the request for at least one media file is associated with a search query from the media device, and wherein the program code segments are further configured to cause the processor to process the log associated with the at least one media file to determine the relevance of the media file with respect to the search query.

13. The system of claim 8, wherein the media file and the advertisement are adapted for display within the embedded media player interface, and wherein the at least one media file identification message includes a request for a new advertising media reference.

14. The system of claim 8, wherein the at least one media file identification message includes rating information provided by the user about the media file.

15. A tangible computer-readable medium storing program code segments, the program code segments configured to cause a processor to perform a method, the method comprising:

receiving, from a media device, a request for at least one media file;

transmitting, to the media device, information defining an embedded media player interface for playing the at least one media file, wherein the embedded media player interface includes:

a media file reference to an address for retrieving the at least one media file from a media file source;

at least one advertising media reference to an address for retrieving at least one advertisement from an advertisement system, and instructions, usable by the media device, for transmitting at least one media file identification message to a remote system, the at least one media file identification message identifying the referenced media file; and receiving, from the media device, the at least one media file identification message for recordation in a log associated with the at least one media file.

16. The medium of claim 15, wherein the at least one media file identification message is received at predetermined time intervals.

17. The medium of claim 16, wherein the instructions are further configured to cause the processor to determine, based on the number of received media file identification messages, a length of time that the media file was displayed.

18. The medium of claim 17, wherein the instructions are further configured to cause the processor to determine, if the length of time that the media file was displayed exceeds the length of the media file by an extended period of time, that the media file was displayed unattended.

19. The medium of claim 15, wherein the request for at least one media file is associated with a search query from the media device, and wherein the instructions are further configured to cause the processor to process the log associated with the at least one media file to determine the relevance of the media file with respect to the search query.

20. The medium of claim 15, wherein the media file and the advertisement are adapted for display within the embedded media player interface, and the at least one media file identification message includes rating information provided by the user about the media file.

* * * * *